United States Patent
Franaszek et al.

(10) Patent No.: US 7,617,364 B2
(45) Date of Patent: *Nov. 10, 2009

(54) SYSTEM, METHOD AND STORAGE MEDIUM FOR PREFETCHING VIA MEMORY BLOCK TAGS

(75) Inventors: Peter A. Franaszek, Mt. Kisco, NY (US); Luis A. Lastras, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/743,697

(22) Filed: May 3, 2007

(65) Prior Publication Data

US 2007/0204109 A1    Aug. 30, 2007

Related U.S. Application Data

(63) Continuation of application No. 10/709,127, filed on Apr. 15, 2004, now Pat. No. 7,337,278.

(51) Int. Cl.
    *G06F 12/08*    (2006.01)
(52) U.S. Cl. .................................... 711/137; 711/128
(58) Field of Classification Search ................. 711/144, 711/145, 202, 137, 122, 203, 128; 709/209
    See application file for complete search history.

(56) References Cited

U.S. PATENT DOCUMENTS

| | | | |
|---|---|---|---|
| 4,807,110 A | 2/1989 | Pomerene et al. ............ 711/213 |
| 5,361,391 A | 11/1994 | Westberg ..................... 395/425 |
| 5,418,973 A | 5/1995 | Ellis | |
| 5,544,342 A | 8/1996 | Dean | |
| 5,715,421 A | 2/1998 | Akiyama et al. ........ 395/421.03 |

(Continued)

FOREIGN PATENT DOCUMENTS

EP    0173893 A2    3/1986

(Continued)

OTHER PUBLICATIONS

Adaptive Variation of the Transfer Unit in a Storage Hierarchy, IBM J. Res. Develop., vol. 22, No. 4, Jul. 1978, pp. 405-412—by P.A. Franaszek and B. T. Bennett.

(Continued)

*Primary Examiner*—Pierre-Michel Bataille
(74) *Attorney, Agent, or Firm*—Cantor Colburn LLP; Derek Jennings (57) ABSTRACT

A method and system for memory management are provided. The system includes a tag cache in communication with one or more cache devices in a storage hierarchy. The tag cache includes tags of recently accessed memory blocks, each tag corresponding to one of the memory blocks and including tag contents. The tag contents control which memory lines of the corresponding memory block are prefetched into at least one of the cache devices. The tag contents further include a bit to control prefetching of memory lines from a next virtual memory block, the bit referred to as a next virtual memory block bit. The next virtual memory block bit in a preceding memory block in a virtual address space is set to a prefetch status when the preceding memory block tag is in the tag cache.

12 Claims, 4 Drawing Sheets

U.S. PATENT DOCUMENTS

| | | | | |
|---|---|---|---|---|
| 5,761,706 | A | 6/1998 | Kessler et al. | 711/118 |
| 5,796,971 | A | 8/1998 | Emberson | 395/383 |
| 5,887,151 | A | 3/1999 | Raz et al. | 395/382 |
| 6,134,643 | A | 10/2000 | Kedem et al. | 711/213 |
| 6,182,133 | B1* | 1/2001 | Horvitz | 709/223 |
| 6,182,201 | B1 | 1/2001 | Arimilli et al. | 711/202 |
| 6,286,075 | B1 | 9/2001 | Stracovsky et al. | 711/5 |
| 6,314,494 | B1 | 11/2001 | Keltcher | |
| 6,535,961 | B2 | 3/2003 | Wilkerson et al. | 711/137 |
| 6,560,676 | B1 | 5/2003 | Nishimoto | |
| 6,598,123 | B1 | 7/2003 | Anderson et al. | 711/133 |
| 6,606,617 | B1 | 8/2003 | Bonner et al. | 707/2 |
| 6,678,795 | B1 | 1/2004 | Moreno et al. | 711/137 |
| 6,687,794 | B2 | 2/2004 | Malik | 711/137 |
| 2003/0221069 | A1 | 11/2003 | Azevedo et al. | 711/136 |
| 2004/0015683 | A1* | 1/2004 | Emma et al. | 712/240 |
| 2004/0030840 | A1 | 2/2004 | Hesse et al. | 711/137 |

FOREIGN PATENT DOCUMENTS

| | | |
|---|---|---|
| JP | 8161230 | 6/1996 |

OTHER PUBLICATIONS

Distributed Prefetch-buffer/Cache Design for High Performance Memory Systems, pp. 254-263, Departments of Computer Science and Electrical Engineering, Duke University, Durham, NC, 1996—by Thomas Alexander and Gershon Kedem.

DRAM-Page Prediction and Prefetching, pp. 267-275, Computer Science Department, Duke University, Durham, Nc, 2000 by Haifeng Yu and Gershon Kedem.

On the Stability of Temporal Data Reference Profiles, Microsoft Research, Redmond, WA—by Trishul M. Chilimbi.

TCP: Tag Correlating Prefetchers, by Zhigang Hu of IBM Corp.; Margaret Martonosi of Princeton University; and Stefanos Kaxiras of Agere Systems.

Performance Study of the Filter Data Cache on a Superscalar Processor Architecture, by Julio Sahuquillo, Salvador Petit and Ana Pont of Universidad Politecnica de Valencia, Spain and Veljko Milutinovic of University of Belgrade, Yugoslavia.

A Data Cache with Multiple Cashing Strategies Tuned to Different Types of Locality, by Antonio Gonzalez, Carlos Aliagas and Mateo Valero of Universitat Politecnica de Catalunya, Barcelona, Spain.

Filtering Superfluous Prefetches using Density Vectors by Wei-Fen Lin, Steven K. Reinhardt of University of Michigan; Doug Burger of University of Texas at Austin; and Thomas R. Puzak of IBM Corporation.

Page Fault Behavior and Prefetching in Software DSMs, by Ricardo Bianchini, Raquel Pinto, and Claudio L. Amorim of Federal University of Rio de Janeiro, Brazil, Technical Report ES-401/96, Jul. 1996.

Adaptive Caching for Demand Prepaging, by Scott F. Kaplan, Lyle A. McGeoch, and Megan F. Cole of Amherst College, Massachusetts—ISMM '02, Jun. 20-21, 2002, Berlin Germany.

Time Series Prediction using Recurrent SOM with Local Linear Models, Research Reports B15, Oct. 1997—by Timo Koskela, Markus Varsta, Jukka Heikkonen, and Kimmo Kashi of Helsinki University of Technology, Finland.

Temporal Sequence Processing using Recurrent SOM, by Timo Koskela, Markus Varsta, Jukka Heikkonen, and Kimmo Kaski of Helsinki University of Technology, Finland.

On the Stability of Temporal Data Reference Profiles, Microsoft Research, Redmond, WA—by Trishul M. Chilimbi, Proceedings of the 2001 International Conf. on Parallel Architectures and Compilation Techniques—2001, Sep. 8-12, 2001, 11 pages.

TCP: Tag Correlating Prefetchers, by Zhigang Hu of IBM Corp.; Margaret Martonosi of Princeton University; and Stefanos Kaxiras of Agere Systems, High-Performance Computer Architecture, 2003, HPCA-9 2003 Proceedings, The Ninth Intern Symposium, Feb. 8-12, 2003, 11 pages.

Performance Study of the Filter Data Cache on a Superscalar Processor Architecture, by Julio Sahuquillo, Salvador Petit and Ana Pont of Universidad Politechnica de Valencia, Spain and Veljko Milutinovic of University of Belgrade, Yugoslavia, MEDEA Workshop Oct. 19, 2000, 8 pages.

A Data Cache with Multiple Cashing Strategies Tuned to Different Types of Locality, by Antonio Gonzalez, Carlos Aliagas and Mateo Valero of Universitat Politecnica de Catalunya, 1995 International Conf. on Supercomputing, Barcelona, Spain, Jul. 3-7, 1995, 12 pages.

Filtering Superfluous Prefetches using Density Vectors by Wei-Fen Lin, Steven K. Reinhardt of University of Michigan; Doug Burger of University of Texas at Austin; and Thomas R. Puzak of IBM Corporation, Computer Design 2001, ICCD 2001, Proceedings 2001 International Conference, 10 pages.

Temporal Sequence Processing using Recurrent SOM, by Timo Koskela, Markus Varsta, Jukka Heikkonen, and Kimmo Kaski of Helsinki University of Technology, Finland, Knowledge-Based Intelligent Electronic Systems, 1998, Proceedings Second International Conf, Apr. 21-23, 1998, vol. 1, 9 pages.

"Anticipating Most-Recently-Used Change in MRU Caches", IBM Technical Disclosure Bulletin, vol. 36, Issue No. 9A, pp. 147-148, Sep. 1993.

"Cache Line Prefetch for Translations with Hashed Page Table," IBM Technical Disclosure Bulletin, vol. 37, Innue No. 11, pp. 221-222, Nov. 1994.

* cited by examiner

SYSTEM, METHOD AND STORAGE MEDIUM FOR PREFETCHING VIA MEMORY BLOCK TAGS

CROSS REFERENCE TO RELATED APPLICATION

This application is a continuation application of U.S. Ser. No. 10/709,127, filed Apr. 15, 2004, the disclosures of which are incorporated by reference herein in their entirety.

BACKGROUND

The invention relates to memory management and in particular, to performing generalized prefetching via memory block, or page, tags in a cache memory system.

In processing systems such as computers, the data to be utilized by a processor is stored in a memory (e.g., main memory, lower level memory) and control logic manages the transfer of data between the memory and the processor in response to requests issued by the processor. The data stored in the main memory generally includes both instructions to be executed by the processor and data to be operated on by the processor. For simplicity, both instructions and true data are referred to collectively herein as "data" unless the context requires otherwise. The time taken by a main memory access is relatively long in relation to the operating speeds of modern processors. To address this, a cache memory with a shorter access time is generally interposed between the main memory and the processor, and the control logic manages the storage of data retrieved from the main memory in the cache and the supply of data from the cache to the processor.

A typical cache is organized into multiple "lines", each line providing storage for a line of data from the main memory which may be many bytes in length. When the processor issues a request for data contained in a particular line in a page, or block, of memory, the control logic determines whether that line is stored in the cache. If the line is stored in cache (i.e., there is a cache hit), the data is retrieved from the cache. If the line is not stored in cache (i.e., there is a cache miss), the data must be retrieved from the main memory and the processor is stalled while this operation takes place. Since a cache access is much faster than a lower level memory access, it is clearly desirable to manage the system so as to achieve a high ratio of cache hits to cache misses.

Memory latency is becoming an increasingly important factor in computer system performance. An implication of this increasing importance is that cache faults from the slowest on-chip cache are becoming more expensive in terms of performance. One approach to mitigating this problem is to increase the size of the cache. Increasing the size of the cache may improve performance, but cache memory is expensive in comparison to the slower, lower level memory. It is therefore important to use cache memory space as efficiently as possible.

One way to improve the efficiency of a cache memory system and to decrease memory latency time is to attempt to anticipate processor requests and retrieve lines of data from the memory in advance. This technique is known as prefetching. Prefetching can be performed by noting dynamic properties of the reference data stream such as sequential and/or strided accesses. Alternatively, prefetching can be performed on the basis of stored information. This stored information might be related to patterns of access within or between memory blocks or pages, or to hints produced by the compiler and/or programmer.

In order to assist in the performance of prefetching, an apparatus may store block-dependent information in main memory. This block-dependent information may be referred to as a block tag or tag. Block tags may be prepared and maintained by hardware and/or software for a variety of purposes including that of aiding a processor in its decisions to prefetch appropriate data from memory. A distinct feature of this scheme is that it enables long term learning of computer behavior, unlike say, schemes that employ a data structure that is stored inside a processor core which necessarily is much smaller in capacity.

Given a performance goal in mind, for example, that of reducing the miss rate in a cache through prefetching, an important issue is to determine the nature of the statistical information that is to be extracted and stored in a tag, along with a representation for it that is compact, yet useful. In the same vein, methods for managing, interpreting tags and generating appropriate system commands are of prime interest. Another important issue is how this information is used and managed when there are multiple processors in a system.

The idea that knowledge of past accesses for a block, or page, in memory may be useful for preparing good prefetch candidates is well known in the art. See for instance, the reference entitled "Adaptive Variation of the Transfer Unit in a Storage Hierarchy" by P. A. Franaszek and B. T. Bennett, IBM Journal of Research and Development, Vol. 22, No. 4, July 1978. In addition, U.S. Pat. No. 6,535,961 describes a mechanism that detects bursts of access to a memory block together with the memory reference that started the burst (the "nominating line"). During this burst, memory access activity for the memory block is stored in a spatial footprint that is associated with the nominating cache line. These spatial footprints are kept in an "active macro block table." When a block becomes inactive, the corresponding spatial footprint is evicted and then stored in a "spatial footprint table." The information in the spatial footprint table is then used to issue prefetch commands.

U.S. Pat. No. 6,678,795 discloses the use of a related idea to prepare prefetch candidates. An invention similar in spirit is described in U.S. Pat. No. 6,134,643 and in an article by Y. Haifeng and K. Gerson entitled "DRAM-Page Based Prediction and Prefetching", 2000 IEEE International Conference on Computer Design: VLSI in computers and Processors Sep. 17-20, 2000 p. 267. The patent and article describe generating prefetches using the information stored in a "prediction table cache", a data structure that maintains for each block, the most recent "N" line accesses to it (each block comprises N lines) using N log2 N bits per block entry. Further, an article by A. Thomas and K. Gershon entitled "Distributed Prefetch-buffer/Cache Design for High Performance Memory Systems", $2^{nd}$ IEEE Symposium on High Performance Computer Architecture HPCA 96, Feb. 03-07 1996, p. 254, teaches a system to store, for each memory block, the address of Up to some number (e.g., four) of blocks that have been referenced in the vicinity of the original block, and to use this information to generate prefetches.

Issues with the prior art described in the previous paragraphs have to do with the quality and amount of information that needs to be stored. A simplistic method that utilizes N bits to describe the accesses to a page may become polluted with irrelevant information. Maintaining the identity of the M most recently referenced lines may require M to be so large that it is a burden on storage (e.g., in the system page tables).

BRIEF SUMMARY

One aspect of the invention is a system for memory management. The system includes a tag cache in communication with one or more cache devices in a storage hierarchy. The tag cache includes tags of recently accessed memory blocks, each tag corresponding to one of the memory blocks and including tag contents. The tag contents control which memory lines of the corresponding memory block are prefetched into at least one of the cache devices. The tag contents further include a bit to control prefetching of memory lines from a next virtual memory block, the bit referred to as a next virtual memory block bit. The next virtual memory block bit in a preceding memory block in a virtual address space is set to a prefetch status when the preceding memory block tag is in the tag cache.

Another aspect of the invention is a method for memory management. The method includes receiving a notification of a cache fault from a cache device. The notification includes a fault memory block and a fault memory line. The method also includes determining if a tag corresponding to the fault memory block is present in a tag cache. The tag includes a prefetch bit corresponding to memory lines within the memory block specified by the tag. In response to not locating the tag corresponding to the fault memory block in the tag cache, the method further includes: fetching the tag corresponding to the fault memory block into the tag cache, prefetching memory lines corresponding to prefetch bits in the tag that are set to a prefetch status into the cache device, and resetting each of the prefetch bits which were set to a prefetch status to a nonprefetch status with a selected probability. The prefetch bit corresponding to the fault memory line in the tag is set to a prefetch status. The selected probability is one eighth.

BRIEF DESCRIPTION OF THE DRAWINGS

Referring now to the drawings wherein like elements are numbered alike in the several FIGURES.

DETAILED DESCRIPTION OF THE EXEMPLARY EMBODIMENTS

An exemplary embodiment of the present invention provides a compact representation of information for use by a prefetch decision engine. The information is stored in a tag that includes N bits per memory block, or page, where N is the number of lines per block. In the rest of the document every reference to a memory block shall be understood to refer not only to a contiguous portion of memory of fixed size but also to the standard notion of a system page. The terms memory block and page are utilized interchangeably in this document unless specified otherwise. Updates to the information (e.g., tags) are performed by a combination of filtering of references, along with a probabilistic aging technique (based on the use of a random number generator) that can be implemented in a relatively straight forward manner.

Additional information may also be stored in the tag to control the movement of data, such as statistics of references to blocks in proximate virtual addresses. Additional statistical information that may be stored in the tag includes the real address of the virtual page that follows the current virtual page, when the block corresponds to a page. This may be useful in determining prefetch candidates. Further information stored in the tag may include a list of processor and/or processes that have accessed the block so that process scheduling decisions can be made. In addition, external traffic conditions may be taken into account and input to prefetching decisions.

Another aspect of an exemplary embodiment of the present invention is a technique for utilizing the tags in a multiprocessor system, where data can reside in any one of multiple caches. Each processor chip within the multiprocessor system can hold a potentially different tag, that is, the tags are not synchronized. As a processor sees a request from another processor for a specific line, it may use the information in its local version of the tag, which may have more current information, to send (push) additional lines to the requesting processor. As tags are flushed from the tag caches, a version of the tag stored in memory is updated.

An exemplary embodiment of the present invention includes a block tag format that may be utilized to perform reference aging. If only N bits are available for storage when a block consists of N lines, a first thought may be to set the $i^{th}$ bit of the block tag to "1" whenever the $i^{th}$ bit of the block tag is accessed. This ensures that every line of the block that has been accessed is registered as such, but has the drawback that excessive information accumulation will take place as time progresses, thus degrading the quality of the inferences that can be made with the aid of the information contained in the block tag. Instead, an exemplary embodiment of the present invention augments the above scheme with the idea of periodically turning off each bit in the tag with a certain probability, "P".

When a microprocessor makes a memory reference that passes a filtering criterion, its corresponding block tag is retrieved from memory (if it is not already inside of the core) and is inserted in a stack, or tag cache, that is managed using replacement techniques known in the art. The prefetch bits in the tag can then be used to produce prefetches for the memory block associated with the tag. Other prefetches are possible depending on the additional features incorporated in the tag as described in the forthcoming paragraphs. Next, the probabilistic aging process is applied to the tag contents which consists of turning off every prefetch bit that is set with a certain probability P.

During the period of time that the block tag spends inside of the stack, filtered references accessed in that block are registered. Filtering refers to selecting a subset of processor references as relevant for prefetch decisions and access history. References to lines that meet the filtering criteria are used to update the corresponding block tag. When the block tag is evicted from the stack, or tag cache, the tag is stored back to memory. The lines for which a bit is set in a block tag constitute prefetch candidates the next time that the block tag is fetched into the stack.

The amount of prefetching that is done by the system may be controlled by changing the turn-off probability parameter, "P". Another method for controlling the prefetching is to randomly select a fraction of the lines for which a bit is set to "1" and issue prefetches only for the selected ones. This method of selecting a fraction of the lines may be useful to control the amount of prefetching when an external traffic measurement indicates that only a limited amount of additional memory requests can be made.

Figure 1:
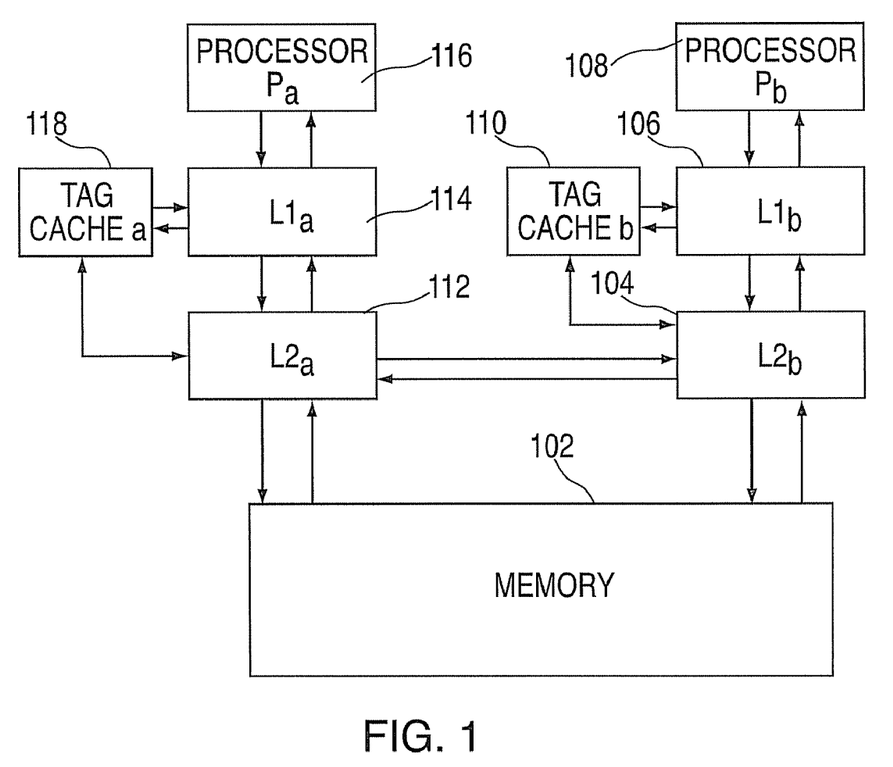
FIG. 1 is a block diagram of a system for prefetching via memory block tags in accordance with an exemplary embodiment of the present invention.

FIG. 1 is a block diagram of a system for performing prefetching via memory block tags in accordance with an exemplary embodiment of the present invention. The system depicted in FIG. 1 includes two processor subsystems $P_a$ 116 and $P_b$ 108 along with their dedicated level one (L1) and level two (L2) caches. The dedicated L1 cache for subsystem $P_a$ 116 is denoted as $L1_a$ cache 114 and the dedicated L2 cache is denoted as $L2_a$ cache 112. Similarly, the dedicated L1 cache for subsystem $P_b$ 108 is denoted as $L1_b$ cache 106 and the dedicated L2 cache is denoted as $L2_b$ cache 104. For purposes of discussion, it is assumed that the data in memory 102 is partitioned into blocks, or pages, of four thousand and ninety six (4K) bytes, that each block, or page, holds thirty-two (32) lines and that each line contains one hundred and twenty-eight (128) bytes of data. Also depicted in FIG. 1 is tag $cache_a$ 118 for subsystem $P_a$ 116 and tag $cache_b$ 110 for subsystem $P_b$ 108. The tags in tag $cache_a$ 118 and tag $cache_b$ 110 are entities associated with individual blocks in the memory 102 and are described below in reference to FIG. 2.

As is shown in FIG. 1, the subsystem $P_a$ 116 is in communication with the $L1_a$ he 114 which in turn is in communication with the $L2_a$ cache 112. The $L2_a$ cache 112 is in communication with the memory 102. As is known in the art, the communication between these components may be via a direct connection or a network connection. The communication path between the subsystem $P_a$ 116, $L1_a$ cache 114, $L2_a$ cache 112 and memory 102 is utilized to request and receive data. The data requested may be stored in the $L1_a$ cache 114, the $L2_a$ cache 112 or the memory 102. In addition, FIG. 1 depicts tag $cache_a$ 118 in communication with both the $L1_a$ cache 114 and the $L2_a$ cache 112. In an exemplary embodiment of the present invention, the tag $cache_a$ 118 includes tags of blocks that hold lines on which the $L1_a$ cache 114 has recently missed. The tag $cache_a$ 118 is updated as lines within these blocks miss from the $L1_a$ cache 114. Further, the $L2_a$ cache 112 is in communication with the $L2_b$ cache 104 to allow the subsystems $P_a$ 116 and $P_b$ 108 to share access to data in their respective L2 caches in order to avoid the need for satisfying a data request from memory 102.

Similarly, the subsystem $P_b$ 108 is in communication with the $L1_b$ cache 106 which in turn is in communication with the $L2_b$ cache 104. The $L2_b$ cache 104 is in communication with the memory 102. As is known in the art, the communication between these components may be via a direct connection or a network connection. The communication path between the subsystem $P_b$ 108, $L1_b$ cache 106, $L2_b$ cache 104 and memory 102 is utilized to request and receive data. The data requested may be stored in the $L1_b$ cache 106, the $L2_b$ cache 104 or the memory 102. In addition, FIG. 1 depicts tag $cache_b$ 110 in communication with both the $L1_b$ cache 106 and the $L2_b$ cache 104. In an exemplary embodiment of the present invention, the tag $cache_b$ 110 includes tags of blocks that hold lines on which the $L1_b$ cache 104 has recently missed. The tag $cache_b$ 110 is updated as lines within these blocks miss from the $L1_b$ cache 104. The components depicted in FIG. 1 are shown as separate devices, however as is known in the art, all or a subset of these components may be included in the same device.

Each tag in tag $cache_a$ 118 and tag $cache_b$ 110 is associated with an individual block, or page, in memory 102. In an exemplary embodiment of the present invention, tag $cache_a$ 118 and tag $cache_b$ 110 are organized as standard cache structures with the storage of tags divided into a set of equivalence classes. Searches for tags associated with a given block in lower level memory are performed in any manner known in the art for cache memory (e.g., by associative search within a congruence class). hi an exemplary embodiment of the present invention, it is assumed, for simplicity, that tag $cache_a$ 118 and tag $cache_b$ 110 are fully associative. Any structure known in the art may be utilized to implement tag $cache_a$ 118 and tag $cache_b$ 110. Computer instructions to implement the processes described herein may be located on one or both of the tag caches, on a memory controller and/or on a processor. As is known in the art the computer instructions may be located on one device or distributed among multiple devices.

Figure 2:
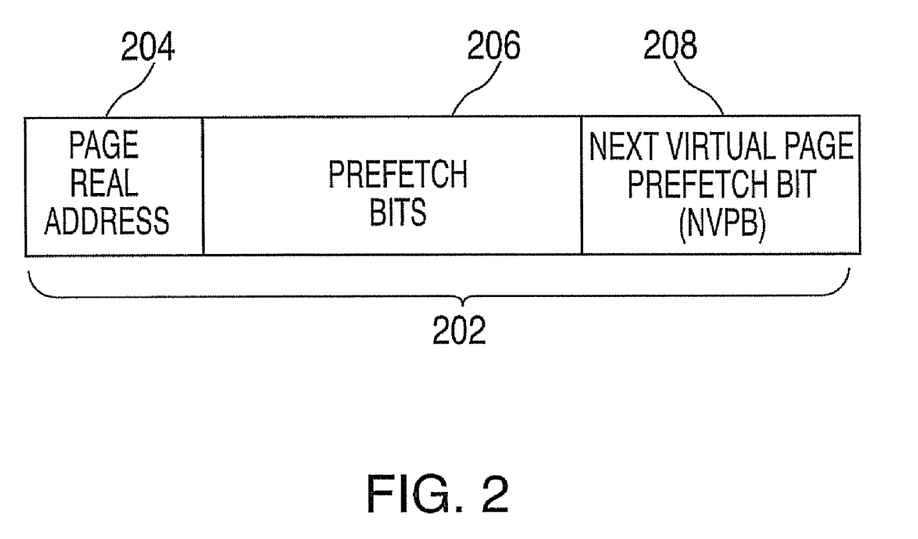
FIG. 2 depicts the contents of a tag utilized in an exemplary embodiment of the present invention.

FIG. 2 depicts the contents of a tag 202 in an exemplary embodiment of the present invention. Both tag $cache_a$ 118 and tag $cache_b$ 110 utilize the tag structure depicted in FIG. 2. A tag 202 includes a page real address field 204, a prefetch bits field 206 and a next virtual page prefetch bit field 208. The page real address field 204 refers to the address of the block, or page, in memory 102. The prefetch bits field 206 includes one bit for each line in the block, or page. As described previously, for pages that are 4K, with lines of one hundred and twenty-eight (128) bytes, there are thirty-two (32) lines per page. Therefore, there are thirty-two (32) bits included in the prefetch bits field 206, each corresponding to a different line in the page. Bits are set to "1", a prefetch status, if the line has been referenced during a current visit to the tag cache (e.g., tag $cache_a$ 118, tag $cache_b$ 110) and the reference has passed through the filtering process. Otherwise the bits are set to "0", a nonprefetch status. The next virtual page prefetch bit field 208 (also referred to as the next virtual memory block bit) indicates if lines contained in the next block, or page, in the virtual address space should be prefetched along with the current page specified by the tag in the page real address field 204.

An exemplary embodiment of the present invention operates as follows. Given certain references by a processor $P_a$ 116 (the discussion will refer to subsystem $P_a$ 116, however, the same principles apply to subsystem $P_b$ 108) to a line, the tag entries associated with the page may be updated or referenced. If at the time of reference, the tag 202 is not present in the tag $cache_a$ 118, the tag 202 is fetched from memory 102, possibly displacing another tag 202 currently in the tag $cache_a$ 118. The displaced tag 202 is written back to memory 102 without regard to the values of tags 202 corresponding to the same page that are held by other processors. An example would be a tag 202 held by tag $cache_b$ 110 for subsystem $P_b$ 108 that corresponds to the same page in memory 102. In an alternate exemplary embodiment of the present invention, the values of the tags 202 corresponding to the same page and held by other processors are taken into account when storing the displaced tag 202.

At the time that a tag 202 is fetched from memory 102 and inserted into the tag $cache_a$ 118, certain lines from the associated page, as described by the bits in the prefetch bits field 206 in the tag 202, may be prefetched. These lines are herein denoted as prefetchable. This process is described in reference to FIG. 3 below. In addition, the value in the next virtual page prefetch bit field 208 is examined, and if it is set to "1", or a prefetch status, lines from the next virtual page are prefetched as described in reference to FIG. 4 below. In addition, the tag 202 may also be updated to reflect current information regarding references to pages which are proximate in the virtual address space. In an exemplary embodiment of the present invention, fetching a line from the L2 cache of another processor may cause the other processor to send not just the requested line, but also all the lines that are indicated as prefetchable in the tag held by the other processor.

Figure 3:
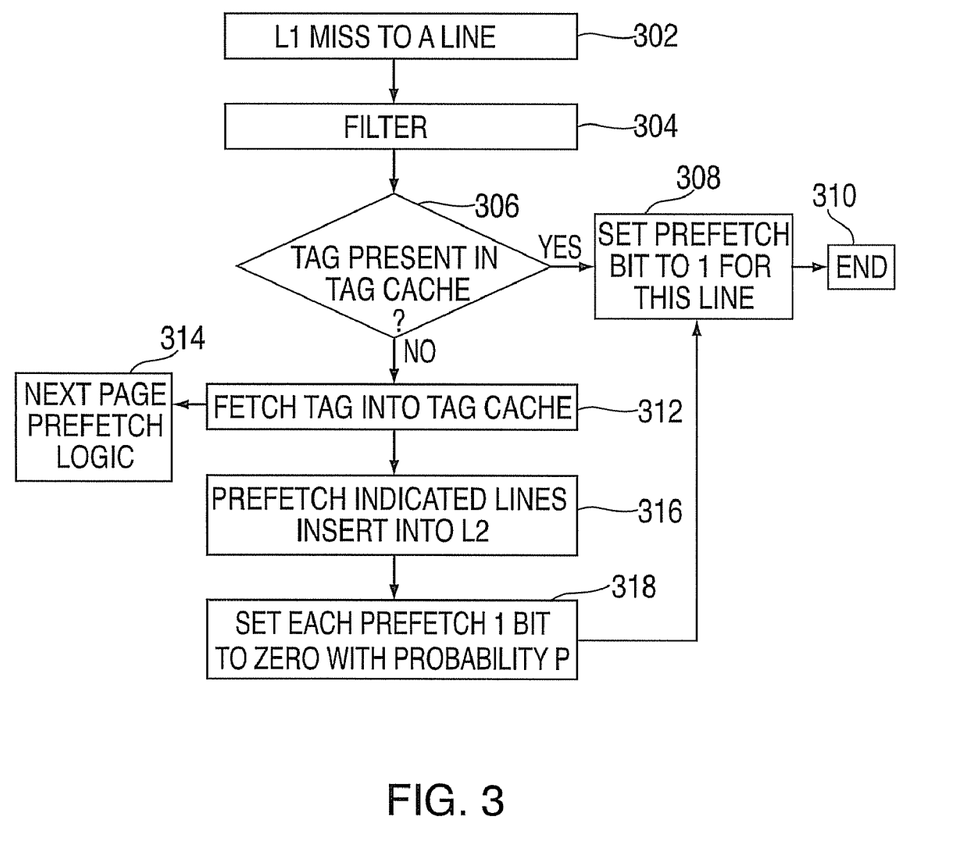
FIG. 3 is a flow diagram of a process that may be utilized by an exemplary embodiment of the present invention for prefetches and prefetch bit updates for lines in a memory block.

FIG. 3 is a flow diagram of a method that may be utilized by an exemplary embodiment of the present invention for performing prefetches and prefetch bit updates for lines in a page. At step 302, the system is notified that a L1 cache miss to a line, in a particular page, has occurred. At step 304, a filtering process is applied to determine if any action should be taken by the tag cache$_a$ 118 in response to the notification. A filter that selects which microprocessor (either local or external) references are used in preparation of the tags 202 may be utilized to enhance the operation of the device. For illustrative purposes, consider a microprocessor device in which prefetches from an external memory are to be inserted in an L2 cache, and therefore, the purpose of the prefetching device is to reduce the L2 miss rate. The entire set of references by the processor to cache lines may contain redundant or unnecessary information, while insufficient information may be provided by just considering L2 misses. An exemplary embodiment of the present invention provides a mechanism that is intermediate between the two extremes. The natural geometry of a set associative cache is exploited to implement a "virtual" filter that requires no additional hardware. For example, the references that cross a prescribed threshold in the stack order of a least recently used (LRU) managed set associative cache (for example L2) are the ones that are used for the preparation of the block tag information. Here, every reference to a line that makes a transition from being the most recently used (MRU) to the second MRU in the stack causes the bit corresponding to this line in the tag to be set to "1". Lines with entries set to "1" are prefetchable.

At step 306, it is determined if the tag 202 corresponding to the line and page is present in the tag cache$_a$ 118. If the tag 202 corresponding to the line and page is present in the tag cache$_a$ 118, then step 308 is performed to set a bit in the tag corresponding to the line to signify that the line was referenced. This is done by setting a bit corresponding to the line to "1" in the prefetch bits field 206. In an exemplary embodiment of the present invention, the bit in the tag corresponding to the line is set to on to signify that the line was referenced whenever a cache device accesses the line (e.g., for read, update) and not just in response to a fault occurring. In this manner, bits that correspond to lines that are prefetched into the cache are also set to "1" when the line is accessed by the cache. After step 308 is performed, processing ends at step 310. Alternatively, if the tag is not present in the tag cache$_a$ 118, as determined at step 306, then step 312 is performed.

At step 312, the tag 202 corresponding to the page is fetched into the tag cache$_a$ 118 from memory 102. Step 312 includes updating the next virtual page prefetch bit field 208, in the tag corresponding to a previous page. At the time that the tag is fetched into the tag cache$_a$ 118, the processor checks the tag cache$_a$ 118 for the presence of a tag 202 corresponding to the page which preceded the current one in its virtual address space. If the page is present, the count in the next virtual page prefetch bit field 208 of the preceding page tag 202 is set to "1". At the time that the tag 202 is written back to memory 102, the next virtual page prefetch bit field 208 is decremented to "0", or to a nonprefetch status, with a probability P. Such decrementation uses the same logic as that for decrementing the prefetch bits field 206. In this example, the threshold for prefetching the tag 202, and thus the lines, from the neighboring pages is set at "1".

Figure 4:
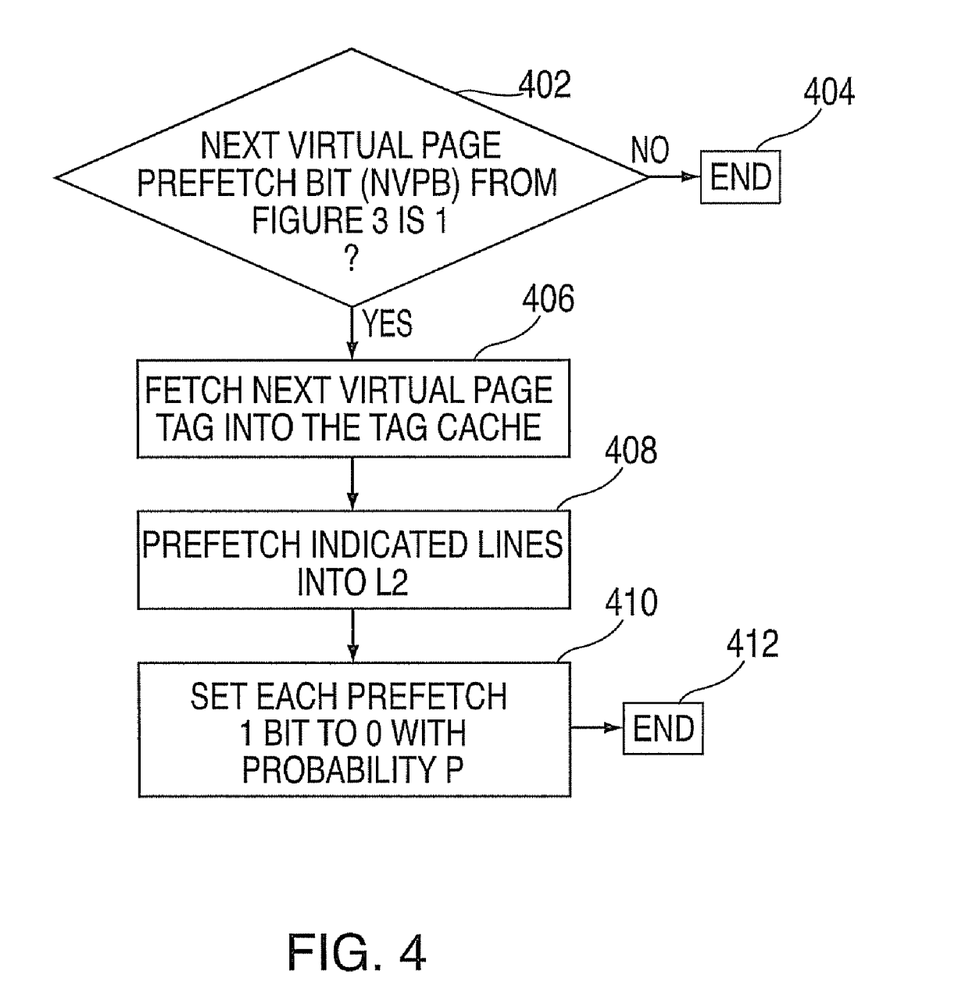
FIG. 4 is a flow diagram of a process that may be utilized by an exemplary embodiment of the present invention for prefetches from a page with a proximate virtual address.

Processing then continues to both step 314 and step 316. At step 314, the next page prefetch logic as described in reference to FIG. 4 is performed. At step 316, lines from the page are prefetched from memory 202 into the L2$_a$ cache 112 if their corresponding bit in the prefetch bits field 206 is set to "1". Next, at step 318 in FIG. 3, each prefetch bit in the prefetch bits field 206 is set to "0", or a nonprefetch status, with a probability of "P" to implement the concept of reference aging. In an exemplary embodiment of the present invention, the probability, P, is approximately one out of eight (⅛). P may be set to any percent value from zero to one and may be utilized to assist in controlling the amount of prefetch activity. This process of aging augments the reference bits in the prefetch bits field 206 in the tag 202 with a procedure which decrements (reduces to zero) each "1" bit with some stated probability "P" each time a tag is written back to memory from the tag cache$_a$ 118.

In the exemplary embodiment described in reference to FIG. 3, the aging process is performed when the tag 202 is fetched into the tag cache$_a$ 118. This has the same effect as performing the aging process each time a tag is written back to memory. An exemplary embodiment of the present invention keeps track of the address which represents the most recent reference to a page different from the tag being processed. For this address, the three least significant bits are examined. If all are zero, then the decision is to decrement to "0". This is an example of one method of producing a pseudo random bit that is "1" with a certain probability. After step 318, processing continues to step 308, as discussed previously.

FIG. 4 is a flow diagram of a method for prefetches from a block, or page, with a proximate virtual address that may be utilized by an exemplary embodiment of the present invention. The processing in FIG. 4 is invoked from step 314 in FIG. 3. At step 402, a check is made to determine if the next virtual page prefetch bit field 208 (also referred to as the next virtual memory block bit) for the tag contains a "1". If it does not contain a "1", signifying that the next virtual page should not be prefetched, processing ends at step 404. Alternatively, if the next virtual page prefetch bit field 208 for the tag does contain a "1", then step 406 is performed to fetch the next virtual page tag 202 into the tag cache$_a$ 118. Next, at step 408, the indicated lines in the tag 202 are prefetched into the L2$_a$ cache 112. As discussed previously, the lines are prefetched if they contain the value "1" in their corresponding bit in the prefetch bits field 206 in the tag 202. Next, each bit in the prefetch bits field 206 that contains a "1" is set to a "0" with a probability of P. In an exemplary embodiment of the present invention, the probability, P, is approximately one out of eight (⅛). As discussed previously, P may be set to any percent value from zero to one and may be utilized to assist in controlling the amount of prefetch activity. Although in this embodiment the probability P for modifying the line and next virtual page prefetch bit in a tag is the same, it should be understood that in some applications, these probabilities should be different. The processing then ends at step 412.

An exemplary embodiment of the present invention provides a compact representation of information for use by a prefetch decision engine. The compact size of the tags may lead to less storage space being required and to increased performance of the cache system. In addition, the ability to age the data stored in the tag may lead to a higher cache hit ratio. An exemplary embodiment of the present invention includes the ability to control the amount of prefetching performed by changing the value of the probability parameter that is used by the aging algorithm. This can assist in balancing the amount of data that is prefetched with the amount of available cache storage.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for memory management in a storage hierarchy comprising a tag cache in communication with one or more cache devices, the method comprising:
    prefetching, via tag contents of the tag cache, specified memory lines of a memory block into the cache device, the tag cache including tags of recently accessed memory blocks, each tag corresponding to one of the memory blocks and including the tag contents;
    wherein the prefetching includes using a next virtual memory block bit in the tag contents to control prefetching of memory lines from a next virtual memory block, comprising:
    setting the next virtual memory block bit in a preceding memory block in a virtual address space to a prefetch status when the preceding memory block tag is in the tag cache; and
    setting the next virtual memory block bit to a non-prefetch status with a specified probability on certain events.

2. The method of claim 1, wherein the certain events include eviction of the tag from the tag cache.

3. The method of claim 1, wherein the tag contents include a memory block real address and one bit for every memory line in the memory block, said bits referred to as prefetch bits; and wherein an access by one of the cache devices to a memory line corresponding to one of the prefetch bits results in the prefetch bit not being reset to a nonprefetch status before the tag is stored back to the memory device.

4. The method of claim 1, wherein the tag contents further control the sending of the entries from the one or more cache devices to storage hierarchies of other processors.

5. The method of claim 1, wherein one of the cache devices is a level two cache device.

6. The method of claim 1, wherein the memory block is a system page.

7. A system for memory management, the system comprising a tag cache in communication with one or more cache devices in a storage hierarchy, wherein:
    the tag cache includes tags of recently accessed memory blocks, each tag corresponding to one of the memory blocks and each tag including tag contents; and
    the tag contents control which memory lines of the corresponding memory block are prefetched into at least one of the cache devices;
    wherein the tag contents further include a bit to control prefetching of memory lines from a next virtual memory block, said bit referred to as a next virtual memory block bit; wherein the next virtual memory block bit in a preceding memory block in a virtual address space is set to a prefetch status when the preceding memory block tag is in the tag cache; and wherein the next virtual memory block bit is turned to a nonprefetch status with a specified probability on certain events.

8. The system of claim 7 wherein the certain events include eviction of the tag from the tag cache.

9. The system of claim 7 wherein the tag contents include a memory block real address and one bit for every memory line in the memory block, said bits referred to as prefetch bits; and wherein an access by one of the cache devices to a memory line corresponding to one of the prefetch bits results in the prefetch bit not being reset to a nonprefetch status before the tag is stored back to the memory device.

10. The system of claim 7 wherein the tag contents further control the sending of the entries from the one or more cache devices to storage hierarchies of other processors.

11. The system of claim 7 wherein one of the cache devices is a level two cache device.

12. The system of claim 7 wherein the memory block is a system page.

* * * * *